(12) United States Patent
O'Neill

(10) Patent No.: US 6,988,698 B2
(45) Date of Patent: Jan. 24, 2006

(54) APPLIANCE MOUNTING APPARATUS

(75) Inventor: Edward L. O'Neill, Oakland, CA (US)

(73) Assignee: Lucasay Manufacturing Co., Oakland, CA (US)

( * ) Notice: Subject to any disclaimer, the term of this patent is extended or adjusted under 35 U.S.C. 154(b) by 0 days.

(21) Appl. No.: 10/829,884

(22) Filed: Apr. 22, 2004

(65) Prior Publication Data
US 2005/0236546 A1 Oct. 27, 2005

(51) Int. Cl.
*A47H 1/10* (2006.01)

(52) U.S. Cl. .................. 248/323; 248/343.3
(58) Field of Classification Search ............ 248/317, 248/323, 324, 342, 343, 346.06, 309.1, 316.8, 248/917
See application file for complete search history.

(56) References Cited

U.S. PATENT DOCUMENTS

| | | | | |
|---|---|---|---|---|
| 4,239,196 A | * | 12/1980 | Hanger | 269/17 |
| 4,566,663 A | * | 1/1986 | Barchus | 248/324 |
| 6,491,293 B1 | * | 12/2002 | Brewer | 269/17 |
| 2002/0088913 A1 | * | 7/2002 | Hsiang | 248/318 |
| 2003/0160142 A1 | * | 8/2003 | Brahler et al. | 248/317 |
| 2004/0211872 A1 | * | 10/2004 | Dittmer et al. | 248/323 |

* cited by examiner

*Primary Examiner*—Ramon O Ramirez
(74) *Attorney, Agent, or Firm*—Niro, Scavone, Haller & Niro

(57) ABSTRACT

A universal adaptor for facilitating the mounting of appliances. The universal adaptor includes upper and lower bracket plates. Either the upper or lower plate may include a mounting connector for engaging a commercially available mounting system. Bracket arms with slots may be located and clamped between the plates. A location pin may be used to engage the plates and the bracket arms, while mounting pins may be used to connect the bracket arms to the appliance. The bracket arm slots permit the bracket arms to be adjustably moved toward or away from the adaptor, facilitating connection between the bracket arms and receptors on the appliance. The bracket arm slots also permit the position of the location pin to be adjusted relative to the center of gravity of the appliance to further facilitate mounting of the appliance. The spacing of the adaptor relative to the appliance may also be adjusted to facilitate the mounting of appliances having varying surface mount topographies. A method for using the universal adaptor of the present invention is also disclosed and claimed.

8 Claims, 3 Drawing Sheets

100
APPLIANCE MOUNTING APPARATUS

BACKGROUND OF THE INVENTION

The present invention relates generally to an apparatus for mounting an appliance and, more particularly, to a universal mounting adaptor. Over the years, apparatus and methods for mounting appliances to walls, ceilings or other structures have varied depending upon the-appliances involved as well as the mounting systems chosen. This is true not only because of varying shapes, sizes and surface topographies for the myriad of appliances for which mounting may be desirable, but also because of the varying weights and centers of gravity for such appliances. As one non-limiting example, television projection appliances alone have such widely varying dimensions and mounting surface topographies, that there is no known adaptor which facilitates mounting substantially all of the variants of this particular appliance.

The present invention is directed to the problem of mounting appliances using a universal adaptor designed to interface with a wide variety of different appliances as well as with varying, commercially available mounting apparatus and systems.

SUMMARY OF THE INVENTION

The present invention overcomes disadvantages of prior adaptors for mounting appliances, while providing new advantages not previously obtainable.

The present invention is directed to a universal adaptor for facilitating the mounting of an appliance. The adaptor comprises upper and lower bracket plates, one of the plates including a mounting connector for engaging a mounting system; a plurality bracket arms positioned between the plates; at least one assembly element engaging the plates and the bracket arms; and a plurality of fasteners adapted to connect the bracket arms to the appliance. The distal ends of the bracket arms may be moved toward or away from the assembly element, and the arms may also be angularly adjusted relative to the assembly element, facilitating connection between the bracket arms and the appliance. The fasteners include height adjustment to facilitate mounting of appliances having varying surface mount topographies.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what is currently believed to be the preferred embodiment and/or best example of the invention. Any alternatives or modifications which make insubstantial changes in function, in purpose, in structure or in result are intended to be covered by the claims of this patent.

Figure 1:
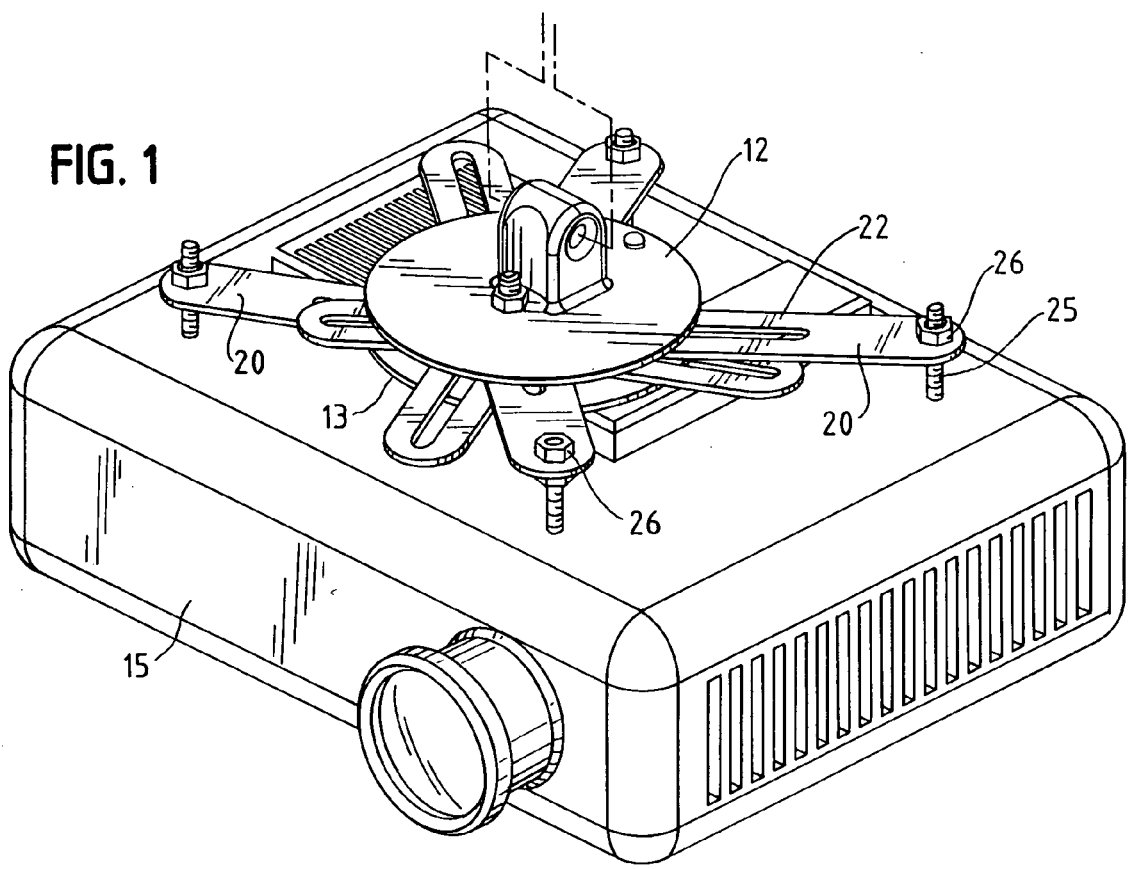
FIG. 1 is a perspective view showing a preferred embodiment of the universal adaptor of the present invention assembled to an appliance to be mounted.

Referring first to FIG. 1, a preferred embodiment of the universal adaptor, generally designated by reference numeral 10, may be assembled to an appliance such as video projector 15, as described below.

Figure 2:
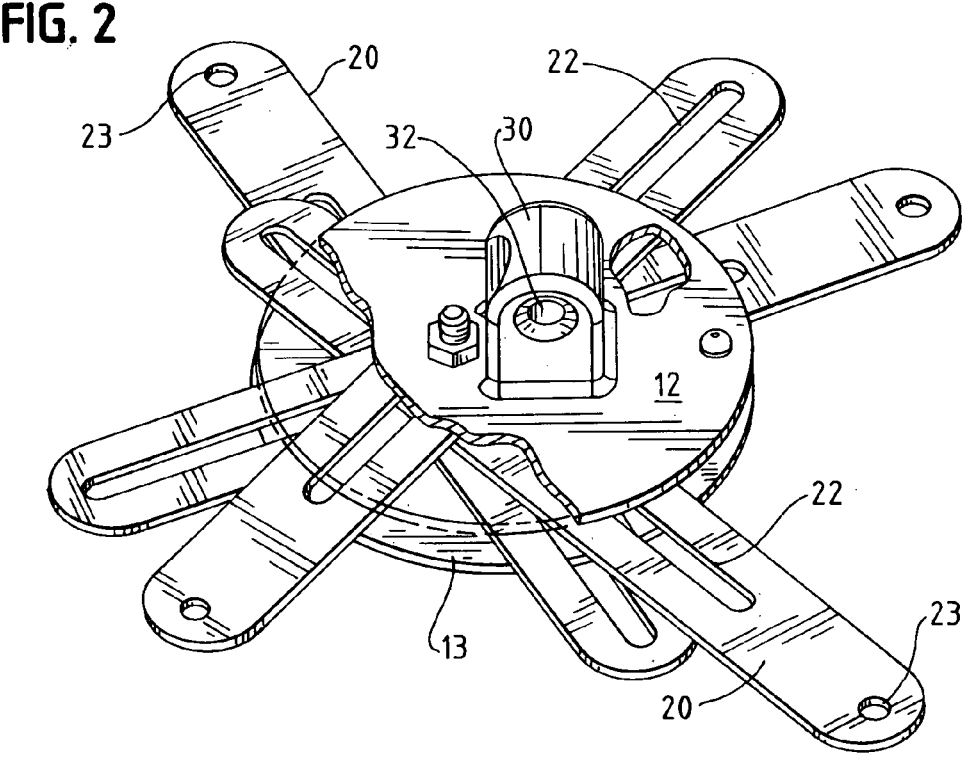
FIG. 2 is a perspective view illustrating various components of the preferred embodiment of the present invention shown in FIG. 1, with the upper bracket plate partially cut away.

Referring now to FIGS. 1 and 2, universal adaptor 10 includes upper and lower bracket plates 12, 13 positioned above and below bracket arms 20 having slots 22 and apertures 23. To assemble the adaptor 10 to appliance 15, bracket arm apertures 23 may accommodate mounting pins 25.or other fasteners, secured by nut 26 or other means. These mounting pins may threadably engage a surface aperture of the appliance, or otherwise connect to receiving sites, which may include brackets or other mounting devices, fastened to the appliance. Adhesives such as tape or glue may also be used for this purpose, although it may be preferred to use a fastening system which permits rapid disassembly and reattachment, for servicing or replacing old appliances. The bracket plates 12, 13 may be assembled to bracket arms 20 using an assembly element, such as a location pin 40 or other fastener, which may pass through plate apertures and bracket arm slots 22, and may be tightened by nut 42 or other fastening means. Location pin 40 is chosen to be of a length sufficient to span the stack height defined by the distance between bracket plates 12, 13. Mounting pins 25 may be of a length to accommodate the stack height and the distance from the lower plate 13 to the appliance mounting surface 25a.

Figure 3:
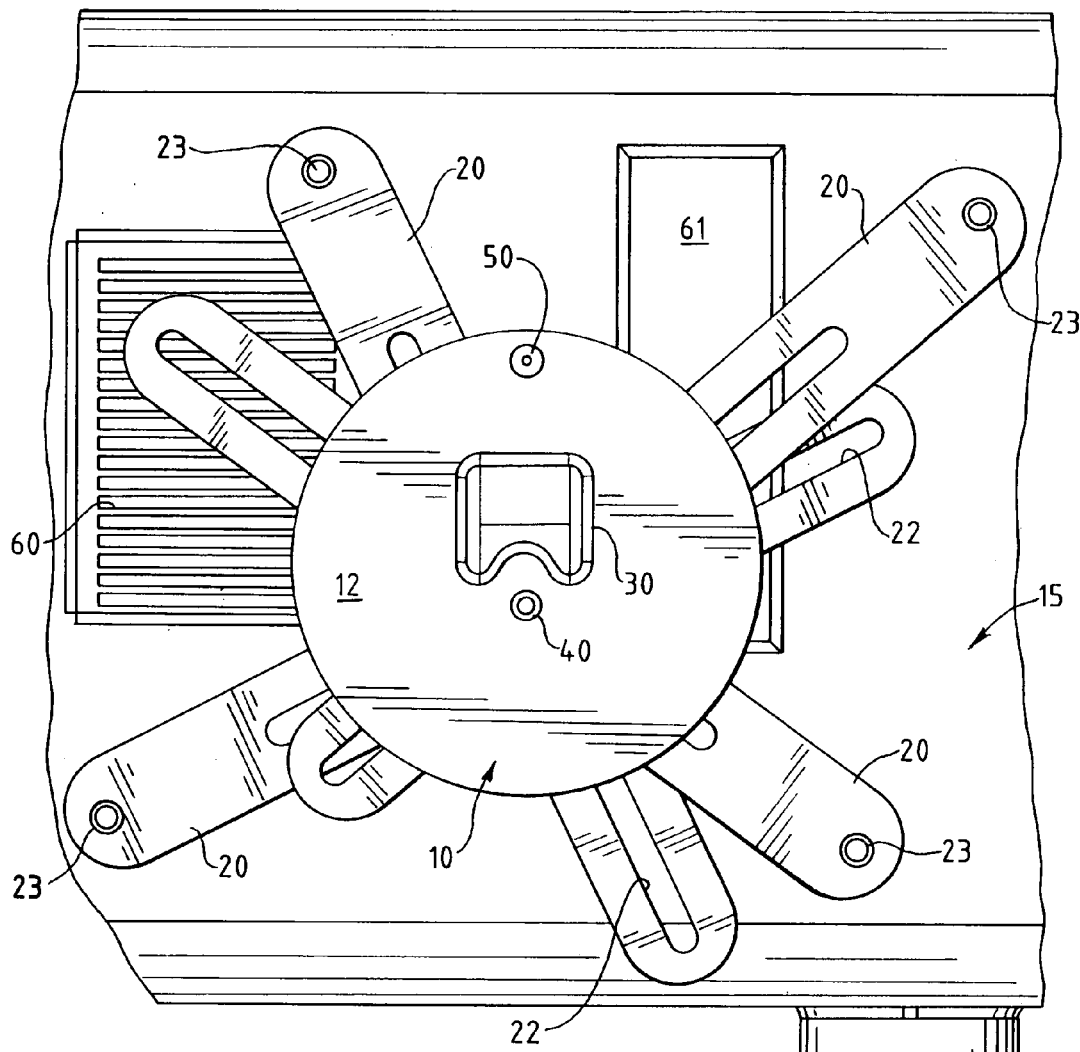
FIGS. 3 and 4 are plan and side views, respectively, of the preferred embodiment and appliance shown in FIG. 1.
Figure 4:
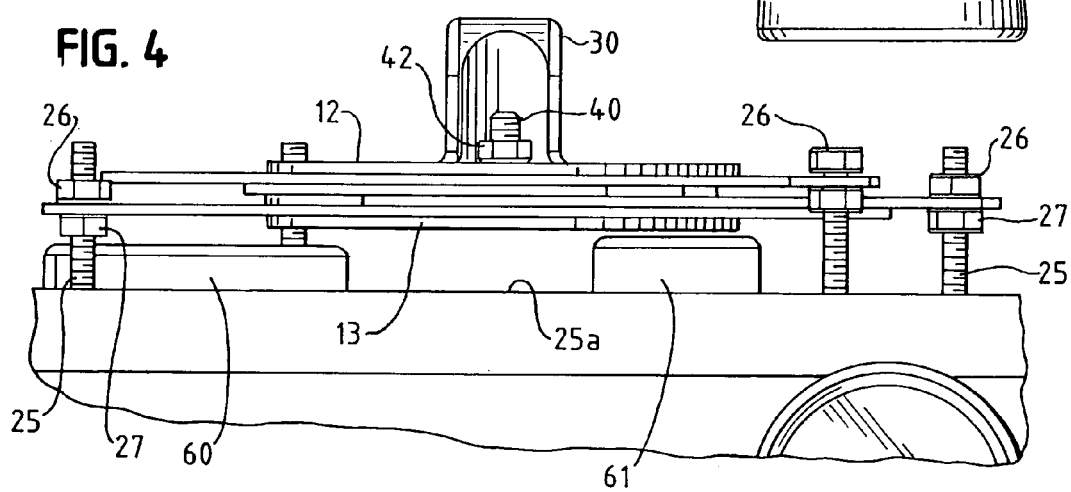

As best shown in FIGS. 1, 3 and 4, by radially and angularly orienting bracket arms 20 in any desired fashion about location pin 40, arms 20 may be positioned so that each aperture 23 at the distal end of each bracket arm 20 is aligned with a receiving site on the appliance. In addition, by adjusting the position of height adjustment nuts 27 on pins 25, the entire adaptor 10 may be spaced from surface 25a sufficiently to avoid fixtures on the surface mount topography of appliance 15, such as grill 60 or compartment 61. The upper and lower plates 12 and 13 also have at least one aperture located near their peripheries to accept a fastener 50, which may simply comprise a threaded bolt. Once the adaptor 10 has been properly assembled to appliance 15, the fastener 50 may be used to secure the assembly in fixed orientation.

It will also be appreciated that bracket plates 12, 13 may be located relative to the appliance, allowing the adaptor 10 to be aligned proximate to the center of gravity of the appliance.

Bracket plates 12, 13 and bracket arms 20 may be made of sheet metal, with thicknesses ranging up to ¼-inch for mounting household appliances. Heavier gauge components may be used for mounting more substantial equipment.

Once installed, universal adaptor 10, now connected to appliance 15, may be mounted to commercially available mounting systems such as those shown in FIGS. 5–8, available from Lucasey Manufacturing Corporation of Oakland, Calif. For this purpose, upper bracket plate 12 may be equipped with a connector, such as connecting boss 30 having aperture 32. It will be appreciated that connector 30 may take many other forms, well known to those of skill in the art, including brackets, threaded fasteners or adhesively joined components.

Figure 5:
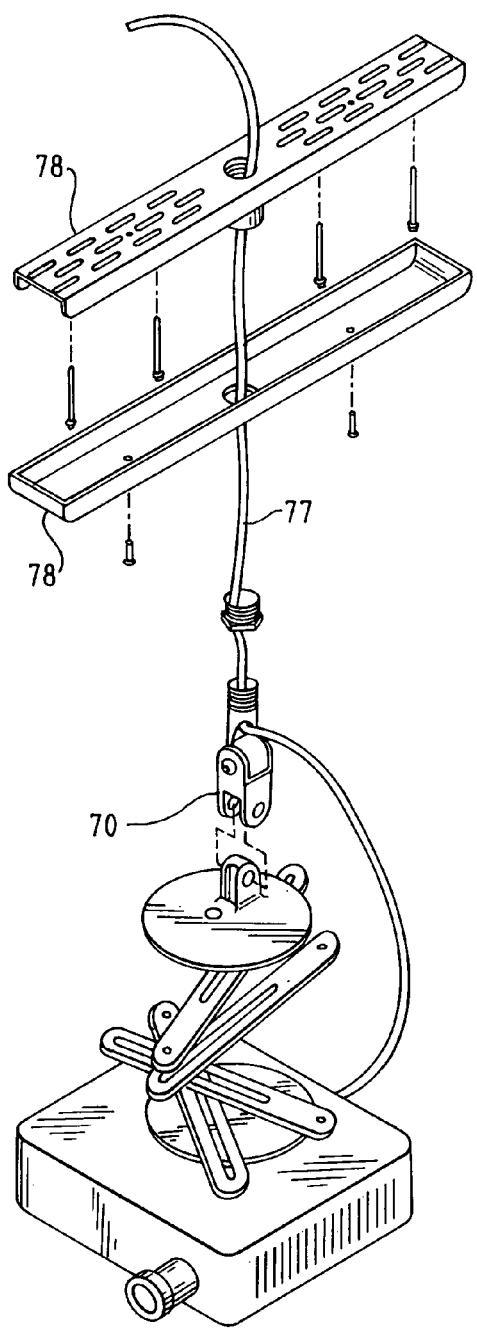
FIGS. 5–8 are perspective views of commercially available mounting apparatus which may be employed to mount the universal adaptor/appliance combination as disclosed and claimed here.
Figure 6:
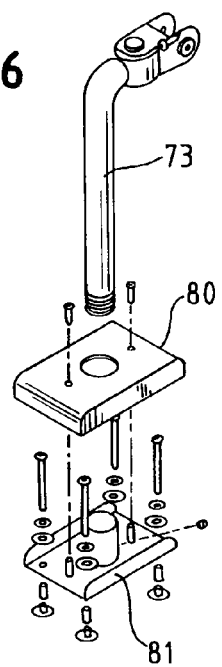
Figure 7:
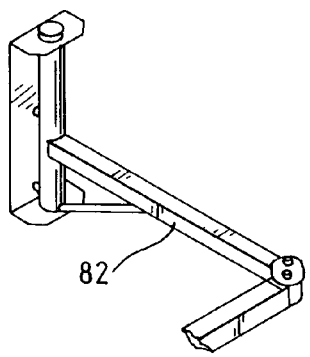
Figure 8:
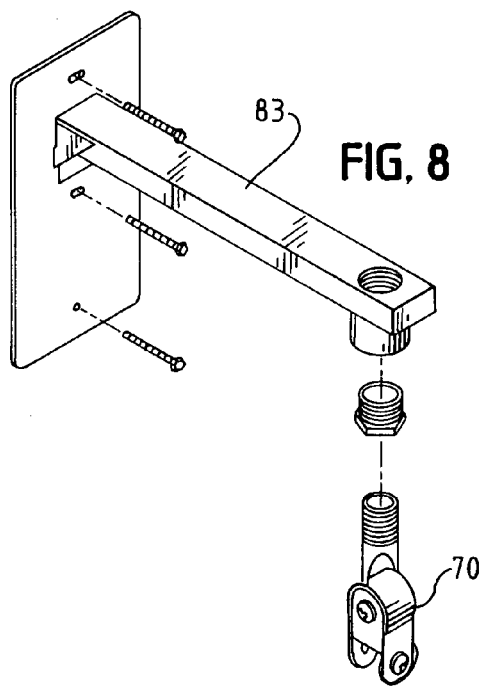

As shown in FIGS. 5–8, the adaptor 10 may be assembled to various mounting systems. FIG. 5 illustrates use of the adaptor with a ceiling mounted system comprising brackets 78, cable 77 and clip 70. FIG. 6 illustrates a floor or other horizontal surface mount system, with a support post 73 assembled to base plates 80 and 81, again using a clip 70 for connection with boss 30 of the adaptor. FIGS. 7 and 8 show two wall mount systems, one having a rotatable boom 82 and the other a fixed boom 83.

The use of opposed bracket plates 12, 13 is preferred, to avoid canting when location nut 42 is tightened, compressing the bracket arms between the plates. However, it is envisioned that for some applications only one plate may be employed. Further, while four bracket arms are shown in the preferred embodiment, it is envisioned that a greater or lesser number of bracket arms may be used for particular applications.

Universal adaptor 10 thus provides an apparatus which can accommodate various mounting environments, such as walls, ceilings, under-the-counter spaces in kitchens, etc. It also eliminates the need for hardware that other adaptors require, and facilitates re-mounting of replacement appliances. Its universal design can be manufactured in a variety of scales and materials to accommodate small to robust applications.

It will be understood from the foregoing description that alternative mechanisms to those described above and shown in the drawings may be employed to connect the bracket plates to each other and to the bracket arms, and to connect the bracket arms to the appliance. Such mechanisms include but are not limited to any of a variety of fasteners and/or adhesive materials.

It will be understood that the method claim is not intended to fix the order of steps for employing adaptor 10. For example, although the method claim may first recite a step of positioning the bracket arms adjacent receiving sites on the appliance. It will be appreciated that a user may choose to first orient the plates and location pin in a desired location before positioning and/or connecting the bracket arms.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

I claim:

1. A universal adaptor for facilitating the mounting of an appliance, comprising:
   upper and lower bracket plates, one of the plates including a mounting connector for engaging a mounting system;
   a plurality of bracket arms positioned between the plates and each having at least one distal end;
   at least one assembly element engaging the plates and the bracket arms;
   a plurality of fasteners adapted to connect the bracket arms to the appliance;
   the distal ends of the bracket arms being extendable or retractable relative to the assembly element, and the arms being angularly adjustable relative to the assembly element, facilitating a connection between the bracket arms and the appliance; and
   said plurality of fasteners including height adjustment adapted to facilitate mounting of appliances having varying surface mount topographies.

2. The universal adaptor of claim 1, wherein each arm has at least one axially extending slot.

3. The universal adaptor of claim 2, wherein the fasteners comprise threaded mounting pins engaging the distal ends of the bracket arms.

4. The universal adaptor of claim 1, wherein the arms include an axially extending slot an aperture located at the distal end of the arms, and wherein the fasteners means comprise threaded mounting pins engaging the bracket arm apertures.

5. A universal adaptor for facilitating the mounting of an appliance, comprising:
   upper and lower bracket plates;
   a plurality of bracket arms positioned between the plates, each arm having at least one slot and at least one distal end;
   an assembly element engaging the plates and the bracket arms while permitting the position of the plates to be adjusted relative to the appliance;
   fasteners adapted to connect the bracket arms to the appliance;
   wherein the slots permit proper positioning of the distal ends of the bracket arms, and also permit the bracket arms to be rotated for facilitating connection between the bracket arms and receiving sites on the appliances, and also permitting the plates to be adjusted relative to the center of gravity of the appliance; and
   wherein a space between the plates and the appliances is adapted to be adjusted to accommodate varying appliance surface topographies.

6. A universal adaptor for facilitating the mounting of an appliance, comprising:
   at least one bracket plate, including a mounting connector for engaging a mounting system;
   a plurality of bracket arms positioned generally parallel to the plate;
   at least one assembly element engaging the plate and the bracket arms;
   a plurality of fasteners adapted to connect the bracket arms to the appliance;
   wherein distal ends of the bracket arms are movable toward or away from the assembly element, and the arms being angularly adjusted relative to the assembly element, for facilitating a connection between the bracket arms and the appliance.

7. A method for employing a universal adaptor to facilitate the mounting of an appliance, the universal adaptor including upper and lower bracket plates and a plurality of bracket arms having slots, the arms being located between the plates, comprising the steps of:
   connecting the bracket plates to the bracket arms using an assembly element which engages the slots of the bracket arms;
   moving the bracket arms along the slots and rotating the arms relative to the assembly element so that distal ends of the arms may be aligned with receiving sites on the appliance;
   adjusting the positions of the plates relative to the center of gravity of the appliance to facilitate an appropriate mounting of the appliance;
   connecting the bracket arms to the receiving sites on the appliance; and
   mounting the appliance by assembling one of the plates to a mount system.

8. The method of claim 7 further comprising the step of adjusting the spacing between the bracket plates and the mounting surface of the appliance.

* * * * *